L. C. ST. JOHN.
Steam Heater.
No. 8,413.  Patented Oct. 7, 1851.
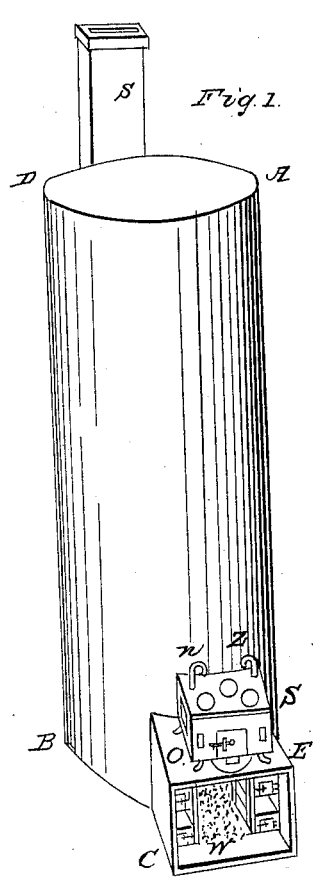
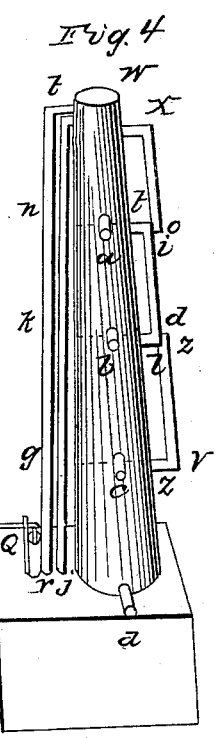
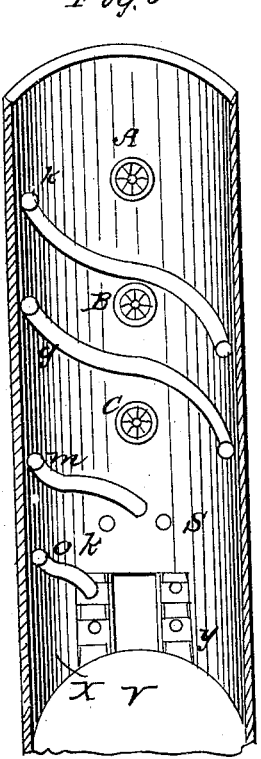
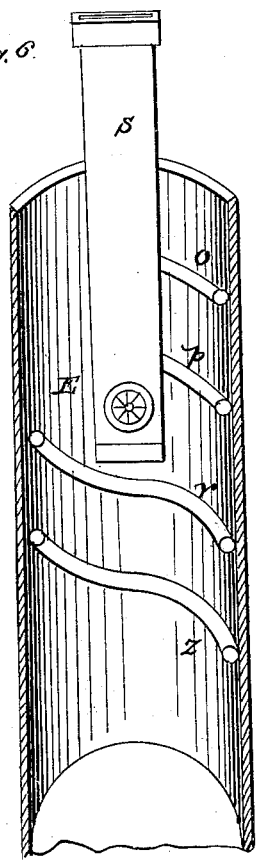
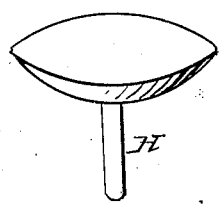
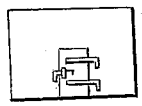

UNITED STATES PATENT OFFICE.

LE GRAND C. ST. JOHN, OF BUFFALO, N. Y.

IMPROVEMENT IN APPARATUS FOR WARMING AIR AND WATER FOR DWELLINGS.

Specification forming part of Letters Patent No. 8,413, dated October 7, 1851.

*To all whom it may concern:*

Be it known that I, LE GRAND C. ST. JOHN, of Buffalo, in the county of Erie and State of New York, have invented certain Improve-provements in the Construction for the Fire and Water of Houses, of which the following, taken in connection with the accompanying drawings and references, is a sufficiently clear and comprehensive description to enable others of competent skill to make and use my invention.

The nature of my invention consists in making a fire-proof apartment with either circular or rectangular sides from the lowest extremity of the house to the roof. At the bottom of this apartment are furnaces, the heat of which enters the apartment. The pipes of stoves enter the same apartment and wind around its sides to a chimney near the roof. In cold weather the heat is taken from this apartment in pipes to warm the house, and in warm weather it is turned out of the house through the chimney. Any requisite degree of heat may be made without waste of fuel. If the fire from the cooking-stove, which passes through the pipe, does not warm the house sufficiently, the heat of one or more furnaces may be added. The top of the apartment has a bowl in the roof, from which the water may pass down in a pipe in the apartment to a reservoir or pass into a structure, filling cisterns opposite the different stories, and the surplus then pass by pipes into a reservoir, from whence it may be re-elevated for the supply of upper rooms.

I will proceed to describe my invention by a description of the figures.

Figure 1 is a perspective view of the apartment. C E is the room in which the furnaces are placed, being on each side of the opening W. A cooking-stove stands on a floor above the furnaces. It has double sides. The rods $n\ z$ turn valves which let the heat of the stove pass into the apartment by the draft of air through the holes O S. The side C E, when closed by the addition of the side Fig. 3, the door then opened, permits the air to pass the same as through the draft-hole of a stove.

Fig. 4 is a structure of cisterns standing inside of Fig. 1. It has within the top pole W the tube H of Fig. 2. The bowl of Fig. 2 is seen as D A of Fig. 1.

In Fig. 4 the dotted lines $n\ o,\ k\ z,\ g\ v$ signify bottoms of cisterns corresponding in altitude to the floors of the house. The first cistern at the top of the structure being full of water, it then passes down the pipe $x\ i$ and fills the next cistern below. It then passes down the pipe $t\ l$ and fills the next cistern below. It then passes down the pipe $d\ z$ and fills the cistern at the bottom. The water then passes down the pipe $t\ j$ into a reservoir within the ground, from whence it is driven by the pump Q up the pipe $r\ y$ to fill any vacant cistern above. The letters $a\ b\ c\ d$ show the pipes for taking the water from the cisterns upon each of the floors of the house.

Fig. 5, shows an internal view of the half of Fig. 1, A D B E. The ends of the furnaces to which the pipes are connected are seen between $x\ v$ and $v\ y$. O is a pipe leading from a furnace. K and S are holes admitting the heat from the cooking-stove into the fire-proof apartment. $m$ is a smoke-pipe from the cooking-stove, which winds above the pipe $o$ until they enter the chimney S of Fig. 6.

In Fig. 5, $g$ and $k$ and also of Fig. 6 $z\ r\ p\ o$ are sections of the two pipes from the furnace and cooking-stove.

In Fig. 5, A B C represent openings with movable covers, through which the heat is taken by pipes to the different rooms of the house. A similar opening is shown at E, Fig. 6, through which the heat is passed up chimney in warm weather by moving the cover from E and closing the openings A B C of Fig. 5.

What I claim as my invention, and desire to secure by Letters Patent, is—

The construction of a fire-proof apartment in houses, extending from the lowest extremity of the house to the roof, with furnaces at the bottom, the smoke-pipes of other fires entering it and winding along its walls to a chimney at the top, and with openings to let the heat in the apartment into the house or up the chimney, and also for the construction of cisterns within the fire-proof apartment with pipes, as above described.

LE GRAND C. ST. JOHN.

Witnesses:
   I. S. SMITH,
   I. F. WALLARD.